(12) United States Patent
Brock

(10) Patent No.: US 9,774,603 B2
(45) Date of Patent: *Sep. 26, 2017

(54) MANAGING USER PERMISSIONS IN RELATION TO SYSTEM EVENTS OCCURRING IN A DATABASE SYSTEM

(71) Applicant: salesforce.com, inc., San Francisco, CA (US)

(72) Inventor: John Arlan Brock, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/724,348

(22) Filed: May 28, 2015

(65) Prior Publication Data

US 2016/0057151 A1    Feb. 25, 2016

Related U.S. Application Data

(60) Provisional application No. 62/040,611, filed on Aug. 22, 2014.

(51) Int. Cl.
| | |
|---|---|
| *G06F 15/16* | (2006.01) |
| *H04L 29/06* | (2006.01) |
| *G06F 21/60* | (2013.01) |
| *G06F 21/62* | (2013.01) |
| *G06F 17/30* | (2006.01) |
| *H04L 29/08* | (2006.01) |

(52) U.S. Cl.
CPC ...... *H04L 63/102* (2013.01); *G06F 17/30876* (2013.01); *G06F 21/604* (2013.01); *G06F 21/6218* (2013.01); *G06F 21/6227* (2013.01); *H04L 63/1416* (2013.01); *H04L 67/02* (2013.01)

(58) Field of Classification Search
CPC ............ H04L 63/1416; H04L 63/1408; H04L 63/1441; H04L 63/1458; G06F 21/552
USPC ................ 713/155–159, 160–167, 189–193; 380/28–30, 44–47, 277–286
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Evans Desrosiers
(74) *Attorney, Agent, or Firm* — Weaver Austin Villeneuve & Sampson LLP

(57) ABSTRACT

Disclosed are examples of systems, apparatus, methods and computer program products for managing user permissions in relation to system events occurring in a database system. In some implementations, a server can listen for system events. Based on at least one system event criterion, a system event can be determined to occur. A user can be identified as matching a user criterion. A permission set can be identified as matching a permission criterion. Based on a permission set, a permission may be added, updated, or removed from a user.

20 Claims, 10 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |

(56) References Cited

U.S. PATENT DOCUMENTS

| | | |
|---|---|---|
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0246527 A1* | 10/2011 | Bitting ............... G06F 21/604 707/784 |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0082197 A1* | 3/2015 | Pearl ..................... G06F 3/048 715/753 |
| 2015/0095162 A1 | 4/2015 | Jakobson et al. |
| 2015/0106736 A1 | 4/2015 | Torman et al. |
| 2015/0142596 A1 | 5/2015 | Jakobson et al. |
| 2015/0172563 A1 | 6/2015 | Jakobson et al. |
| 2016/0105409 A1 | 4/2016 | Torman et al. |

\* cited by examiner

Automated Permissioning Jobs 600

| | Pending | Executed | Failed | | | | |
|---|---|---|---|---|---|---|---|
| | Job id | Description | System Event | Action | User Query | Permission Set Query |
| 604a | | | | | | | |
| 604b | OPJx1 | Add account perms | Time | Add | UQuery 1 | PSQuery 1 |
| 604c | OPJx2 | Change Perms | Mobile Login | Remove | UQuery 2 | PSQuery 2 |
| 604d | OPJx3 | Add Perms on Req | Workflow App | Add | UQuery 3 | PSQuery 3 |
| 604e | OPJx4 | Remove Perms | Export > 100 | Remove | UQuery 4 | PSQuery 4 |
| | OPJx5 | Change Profiles | Time | Change | UQuery 5 | PSQuery 5 |
| | ... | | | | | |

608 — Pending; 612 — Executed; 616 — Failed

*FIGURE 6*

MANAGING USER PERMISSIONS IN RELATION TO SYSTEM EVENTS OCCURRING IN A DATABASE SYSTEM

PRIORITY DATA

This patent document claims priority to commonly assigned U.S. Provisional Patent Application No. 62/040,611, titled "Time-Based User Permissioning", by John Arlan Brock, filed on Aug. 22, 2014, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to user permissions in the context of database systems. More specifically, this patent document discloses techniques for managing user permissions in relation to system events occurring in a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 6 shows a permission monitoring window 600 in the form of a GUI as displayed on a computing device for reviewing automated permissioning jobs, in accordance with some implementations.

DETAILED DESCRIPTION

Figure 1:
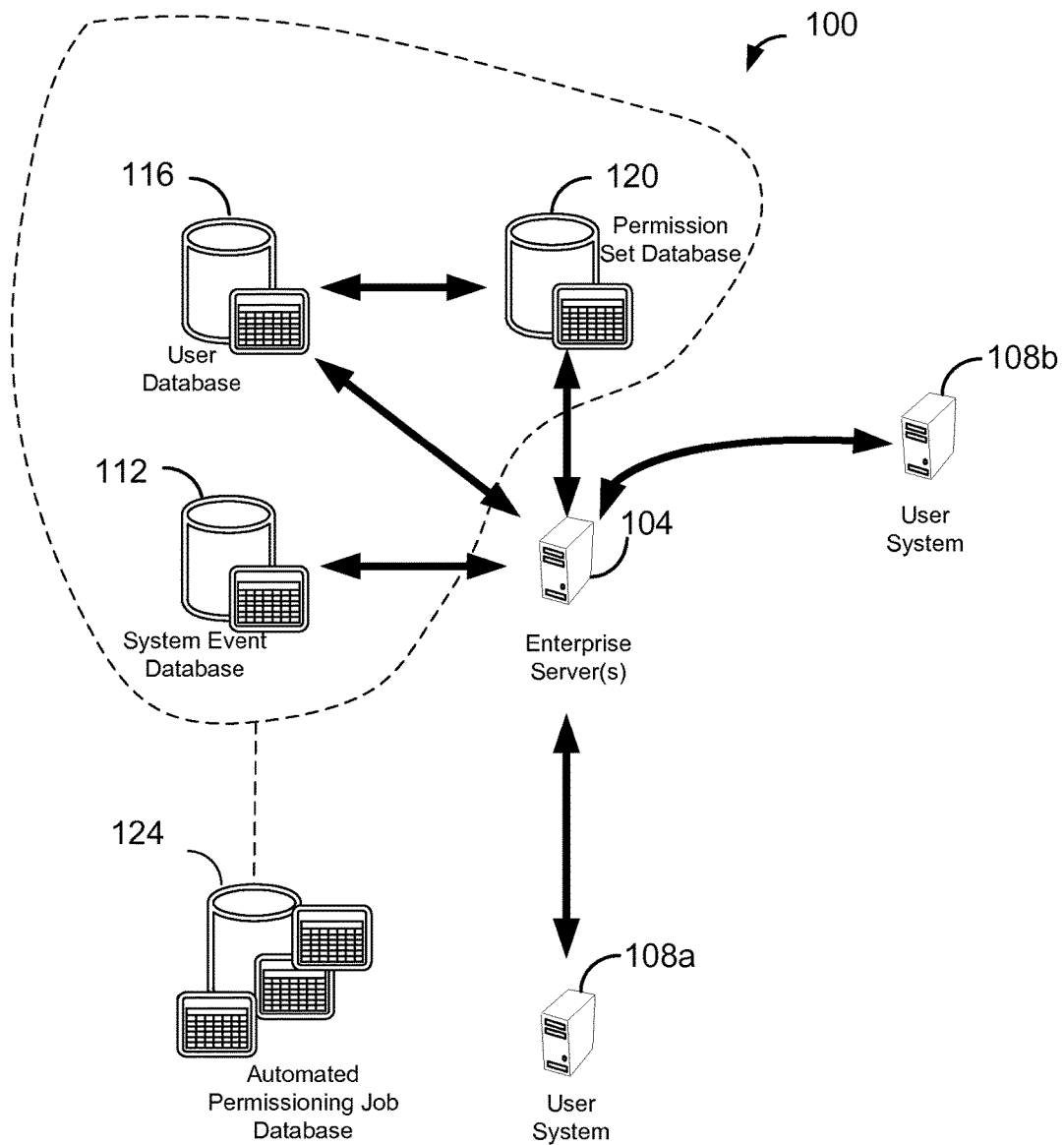
FIG. 1 shows a system diagram of an example of a database system 100 for managing user permissions based on system events, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some of the disclosed implementations of systems, apparatus, methods and computer program products are configured for managing user permissions based on system events occurring in a database system. For example, in response to the occurrence of a system event, a server may add and/or remove permissions defining levels of access for a user of a computing platform implemented using the database system.

By way of example, in a conventional enterprise computing system incorporating a customer relationship management (CRM) database, there is often a significant number of users interacting with data objects such as CRM records (accounts, leads, opportunities, contracts, contacts, etc.) stored in the CRM database. User access to individual data objects or categories of such data objects can be controlled through permissions. For example, one permission may allow a user to view accounts in the CRM database. However, the same user may lack another permission required for editing accounts. In conventional scenarios, when it is desirable to update a user's permissions to provide edit privileges, a system administrator manually adds one or more appropriate permissions.

In modern databases and other computing environments, users are often assigned numerous permissions that grant different levels of access to various data objects. To illustrate, one user may have a permission to edit and view knowledge articles or another type of document or file stored in a database system, while another user may only have a permission to view knowledge articles. Manually adding or removing permissions by a system administrator often leads to human error such as removing the wrong permission for a group of users, adding a permission on the wrong day, forgetting to remove a permission, etc. Such human error often leads to additional costs and wasted time in correcting the mistake, and human error can introduce security threats to an enterprise system.

By way of illustration, Rainbow Readers is a large book publisher using an enterprise system integrated with CRM databases to manage the sales and distribution of their large catalog of books. Each employee at Rainbow Readers has a user profile storing or linked with permissions defining the employee's access to various database records, files, and other resources maintained by the enterprise system. Through user permissions, the enterprise system controls the ability of Rainbow Readers employees to view and/or make changes to resources in the enterprise system. In some situations, an employee's ability to view or make changes to a certain file or type of file may depend on the employee's job function. For instance, a Rainbow Readers sales manager may have the ability to create, view and edit a new sales account, while a sales representative may only be able to view the sales account.

Tammy, Abraham, and Xiu are accountants employed by Rainbow Readers. Ordinarily, accountants at Rainbow Readers lack the permission to edit sales reports stored as documents in a database of the Rainbow Readers enterprise system. However, it is one month before Rainbow Readers' tax filing is due. Each year, in order to prepare the tax filing, the accountants at Rainbow Readers are temporarily granted permissions to make changes to sales reports. At 11:59 pm on March $14^{th}$, Ron, an off-site system administrator at Rainbow Readers manually adds an edit permission to each accountant's user profile. Over the next four weeks, the accountants prepare and complete the tax filing. At 12:01 am on April $16^{th}$, Ron attempts to remove the temporary permissions for the accountants. Unfortunately, Ron, tired from a long day of work, mistakenly removes all permissions from every user profile in the enterprise system. Unaware of his mistake, Ron falls asleep. The next morning, all employees at Rainbow Readers are unable to access and work with resources of the enterprise system because of Ron's mistake. The problem remains unresolved until Ron wakes up in the afternoon, resulting in a company-wide shut down for half of the day and substantial financial loss to Rainbow Readers.

Some of the disclosed techniques can be implemented to automatically manage users' permissions according to certain system events or types of system events occurring in an enterprise system or other computing environment. By way of example, a server of an enterprise system can recognize that a system event occurred at an identifiable date and time. In response to recognizing the system event or the type of system event, a first set of criteria can be applied to identify users relevant to the system event, and a second set of criteria can be applied to identify relevant permissions. The identified permissions may then be added or removed based on the system event and the determinations based on application of the sets of criteria. Returning to the example above, a calendared system event could be automatically scheduled between March $14^{th}$ and April 16th of each year were, on March $14^{th}$, human resources (HR) records are searched to identify the current roster of accountants, the tax documents and records relevant to preparing a tax filing, and the appropriate permissions to provide the identified accountants with edit privileges for those tax documents and records. Any added permissions could be tracked and automatically removed from the identified accountants' permissions on April $16^{th}$.

In another scenario, after recently being fired from Rainbow Readers, a disgruntled employee attempts to export all customer accounts in order to sell the information to a competing book publisher. Because there is no mechanism in conventional systems to stop the employee, Rainbow Readers might not be able to prevent and might not even discover that their sensitive information had been stolen. However, implementing some of the disclosed techniques, a system event causing removal of employee permissions can be immediately triggered or scheduled in response to the firing of an employee or in response to an employee exceeding on account export limitation. For example, a system event could be in the form of a user's HR file being updated to show his or her status as being "terminated", or a system event could be in the form of a user request to export more than 1000 accounts.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

In some but not all implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Permission sets can be used in conjunction with some computing systems. For instance, the assignments of users and permission sets may be stored in one or more databases of an on-demand database service environment. Thus, users may receive permission to access certain resources. A permission server in a database system can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some on-demand database service environments, an Application Programming Interface (API) is configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission can reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

Permission sets have licensing implications, because the specific permissions granted to a user may be limited by the user's license. For example, an employee's user license may not permit the employee to access manager data objects. Consequently, the employee user should not be assigned a permission set that includes permission to access manager data objects. One way to ensure that permission sets are not assigned to users in a way that violates their user licenses is to associate every permission set that is created with a user license, and to validate upon creation of the permission set that none of the permissions in the permission set violate the user license associated with the permission set. However, in situations where an administrator wishes to grant a single permission to multiple users with different user licenses, this system may require an administrator to create multiple permission sets having the same single permission in order to grant that permission to multiple users with different user licenses. As an example, if there are five different user license types, and an administrator wishes to assign an "API Enabled" permission to all users, the administrator would need to create five permission sets, each containing only the "API Enabled" permission, and each corresponding with one of the five different user licenses. The implementations described herein reduce this administrative overhead by creating only one "API Enabled" permission set, which may be assigned to users having different user license type.

As another example, an independent software vendor wishes to publish a custom application consisting of custom objects, fields, classes, and pages, to be accessed by all users of an organization in a multitenant database environment. The vendor may wish to create permission sets that grant access to the custom objects, fields, classes, and pages of the custom application to all users. The implementations described herein allow the vendor to create a single permission set that may be assigned to any license type to grant access to the vendor's application, making it easier for independent software vendors to install permissions with their custom applications, rather than creating one permission set for each license that may be available in an organization.

In some implementations described herein, a permission set may be created by an administrator without being associated with a user license. Validation of the permission set may not occur until the permission set is assigned to a user, at which point the server identifies the user license associated with the user and determines whether the permission set being assigned to the user violates the user license associated with the user. For example, a single "API Enabled" permission set may be created. This permission set may then be assigned to users of all license types, because all of the license types allow the "API Enabled" permission to be assigned to the users. This obviates the need to create an "API Enabled" permission set for each user license type.

In some implementations, when a permission set is modified to include additional permissions, the modification may be validated by the server, because the additional permissions may violate a user license of a user to whom the permission set is assigned. When the server receives a request to add one or more permissions to a permission set, the server identifies the users to whom the permission set is currently assigned, identifies the user licenses associated with those users, and then determines whether the additional permissions will violate any of the user licenses.

In addition to user licenses, other constraints may be implemented to determine what permissions a user may possess. User constraints may take the form of any logical grouping of metadata that has access controls. For example, other user constraint forms may include an online community, an application, a line of business, or an independent software vendor application. Having these flexible user constraints allows an administrator of a system to grant access to various system resources based on the needs of the business.

FIG. 1 shows a system diagram of an example of a database system 100 for managing user permissions based on system events, in accordance with some implementations. Database system 100 includes a variety of different hardware and/or software components which are in communication with each other. In the non-limiting example of FIG. 1, database system 100 includes at least one enterprise server 104, at least one system event database 112, at least one user database 116, and at least one permission set database 120. In some, but not all implementations, automated permissioning job database 124 includes some or all of system event database 112, user database 116, and permission set database 120. Also or alternatively, system event database 112, user database 116, and permission set database 120 can be arranged as tables in automated permissioning job database 124 as part of a shared database. In addition, automated permissioning job database 124 can store and maintain data objects such as customer relationship management (CRM) records of an organization. CRM records include instances of accounts, opportunities, leads, cases, contacts, contracts, campaigns, solutions, quotes, purchase orders, etc. User systems 108a and 108b can interact with database system 100 by sending and receiving data to and from one or more servers and/or databases of database system 100.

Enterprise server 104 may communicate with other components of database system 100. This communication may be facilitated through a combination of networks and interfaces. Enterprise server 104 may handle and process data requests from user systems 108a and 108b. Likewise, enterprise server 104 may return a response to user systems 108a and 108b after the data request has been processed. For example, enterprise server 104 may retrieve data from one or more databases, combine some or all of the data from different databases, and send the processed data to user system 108a or 108b.

Also or alternatively, enterprise server 104 can be configured to process system events. In some implementations, system events may be triggered from real-time interactions by a user of user system 108a with a data object in database system 100. For instance, a user's request to export 10,000 data objects and be identified and processed as a system event by enterprise server 104. In other implementations, system events may be triggered by enterprise server 104. In one example, a system event may be in the form of expiration of a timer configured by enterprise server 104.

System event database 112 can be configured to receive, transmit, store, update, and otherwise maintain system event data from enterprise server 104. In some implementations, system events can be recognized by an event listener that is configured by enterprise server 104. A system event may be identified based on criteria, which enterprise server 104 may store in system event database 112.

User database 116 can include user records such as user profiles for members of an enterprise system. User records in database 116 can be linked with and/or share data with other databases such as permission set database 120. In some implementations, a user record includes a user id, a user name, etc. for uniquely identifying a user of database system 100. A user profile may include general information, as well as include or identify permissions granted for that type of profile. Basic permissions may reflect a level of access for functions that a type of user generally performs. For example, a user may have a "sales support" profile, which includes permissions for viewing and escalating a lead. However, a "sales manager" profile can include permissions for creating a new lead in addition to viewing and escalating a lead. Also or alternatively, multiple users may have the same user profile. For instance, four different users can be assigned the profile of "sales support."

Permission set database 120 can store and manage sets and subsets of permissions. Permission sets may be arranged hierarchically with subsets of permissions dependent on other sets of permissions. For example, a permission set may include a permission to view and edit contacts. A subset of that permission set may include a permission that limits the contact fields (name, phone, etc.) that may be edited. As such, a user assigned that permission set could edit a contact's phone number, but may only view the contact name. In some implementations, permission sets may be added to user records from user database 116 in order to customize a user's permissions. For example, along with the basic permissions from a user's profile, a user may have many permissions added. As discussed above, multiple users may have the same user profile, but among these users, they may have different permission sets. For example, two users may be assigned a "sales support" profile, and one user may have a permission set that includes a permission to create a new lead, while the other user does not have that permission set.

User systems 108a and 108b may be computing devices capable of communicating via one or more data networks with a server. Examples of user systems 108a and 108b include a desktop computer or portable electronic device such as a smartphone, a tablet, a laptop, a wearable device such as Google Glass®, another optical head-mounted display (OHMD) device, a smart watch, etc. Also or alternatively, there may be permissions specific to the electronic device of user systems 108a and 108b. In some implementations, when a user successfully logs into database system 100, enterprise server 104 grants a user of user system 108a permissions to interact with various data objects. Permissions granted to the user include the permissions from the user profile and the permission sets assigned to that user. In some implementations, permissions may be granted or removed based on user interactions with data objects in database system 100.

Figure 2:
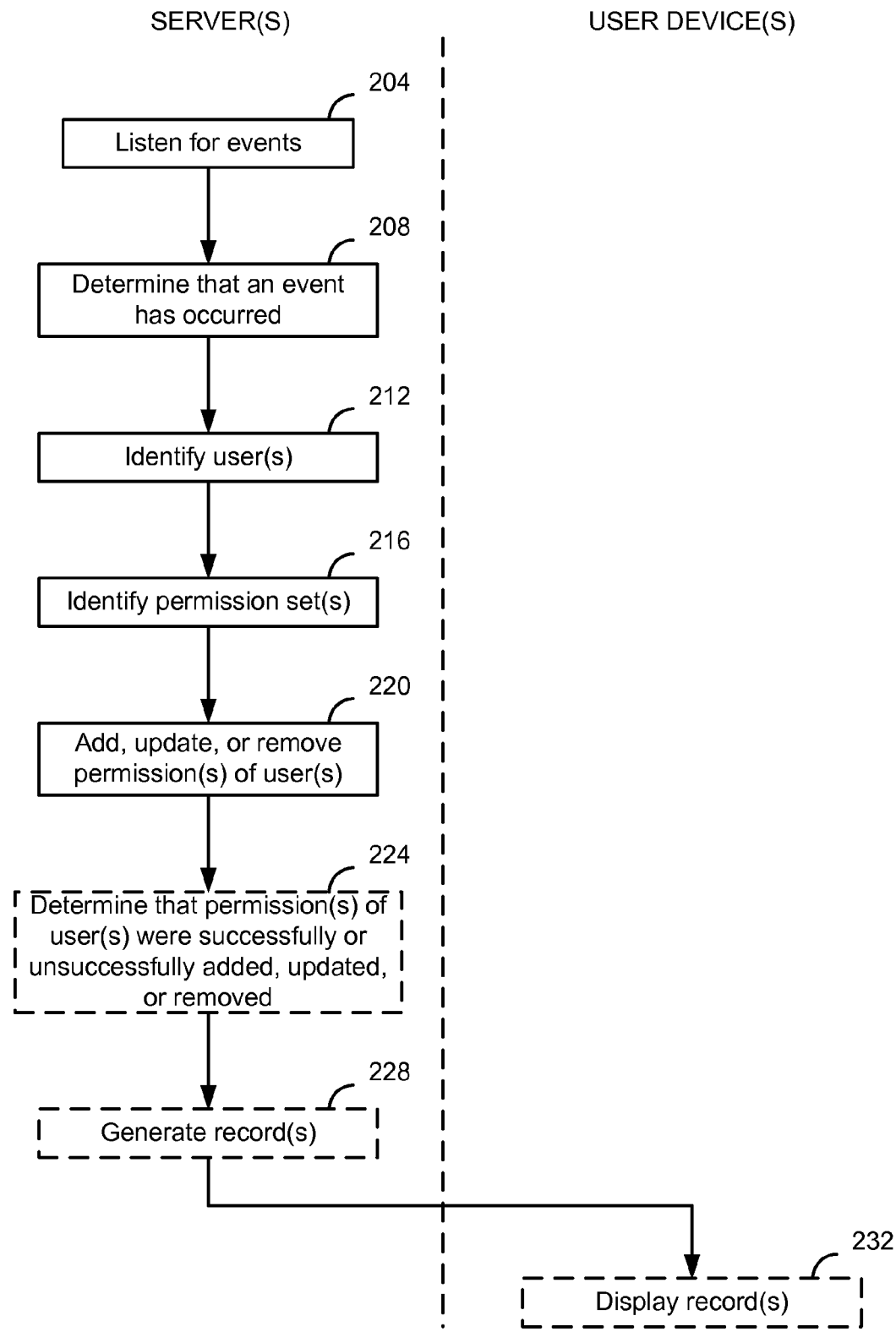
FIG. 2 shows a flow chart of an example of a method 200 for managing permissions of users to access and interact with data objects in a database system, in accordance with some implementations.

FIG. 2 shows a flow chart of an example of a method 200 for managing permissions of users to access and interact with data objects in a database system, in accordance with some implementations. Method 200 and other methods described herein may be implemented using database system 100 of FIG. 1, although the implementations of such methods are not limited to database system 100.

In block 204 of FIG. 2, a server such as enterprise server 104 of FIG. 1 implements one or more event listeners to listen for system events. In some implementations, enterprise server 104 compares data received from user system 108a to system event criteria for designated types of system events stored in system event database 112. In some implementations, event listeners are configured to process streams of event data and may be tracked according to an event listener ID. Also or alternatively, a type of system event may be designated by enterprise server 104 according to system event criteria.

Figure 3:
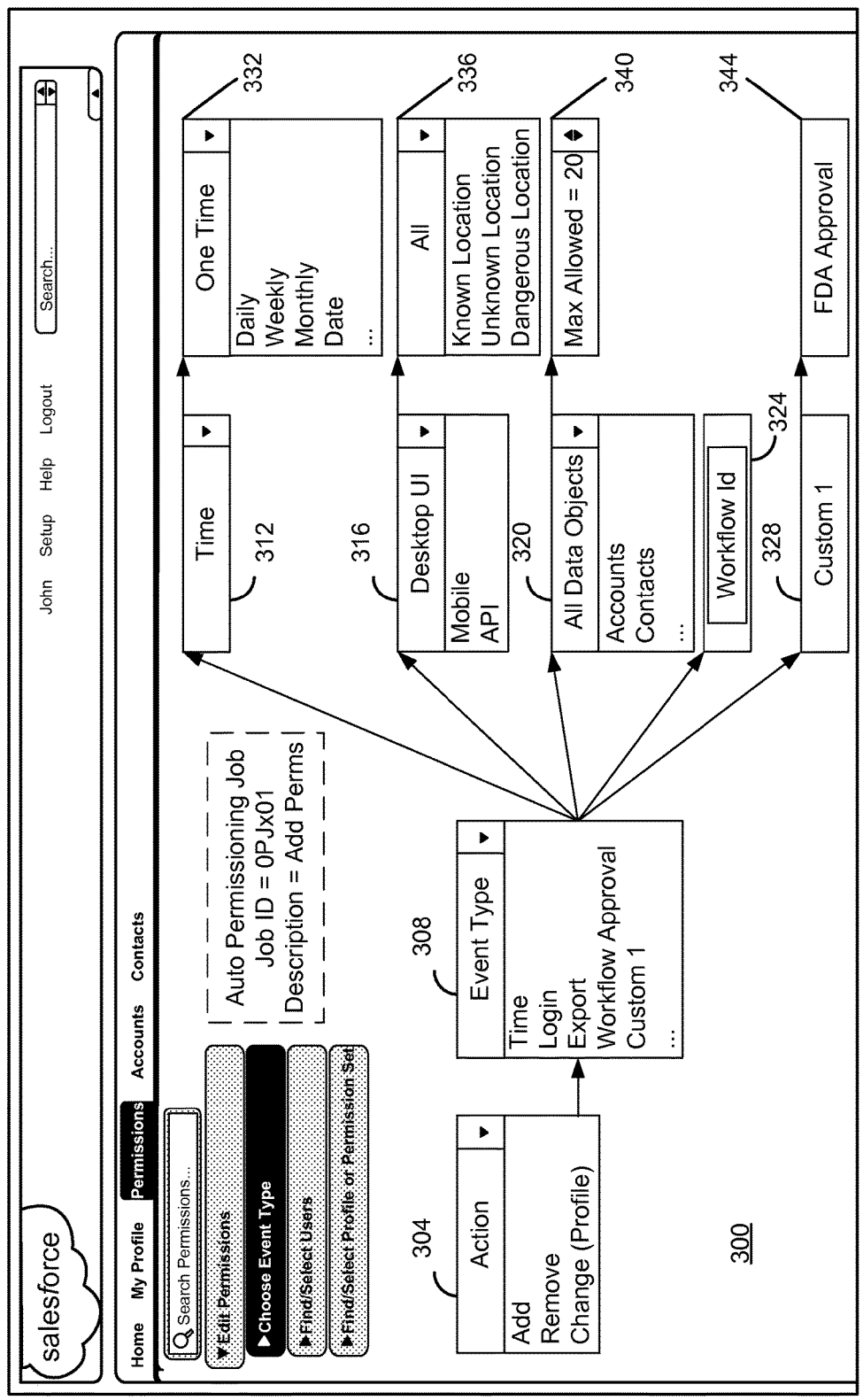
FIG. 3 shows an example of a user interface 300 in the form of a graphical user interface (GUI) as displayed on a computing device for selecting an event type, in accordance with some implementations.

FIG. 3 shows an example of a user interface 300 in the form of a GUI as displayed on a computing device for selecting an event type, in accordance with some implementations. In this example, a sequence of picklists can be displayed. Beginning with action list 304, subsequent picklists may be dynamically populated according to selections in previous picklists. For example, a user may select "Add" from action list 304. Based on this selection, event type list 308 may populate a list including "Time," "Login," "Export," Workflow Approval," "Custom 1," etc.

In some implementations, a user may select "Time" from event type list 308, which populates time list 312. By way example, a system administrator could select system event criteria to remove permissions from sales representatives during the hours of 1:00 am to 3:00 am while website maintenance is underway. As such, the system administrator could select "Time" from event type list 308 with system event criteria 332 "Daily" and a time period of "1:00:00-3:00:00." In some implementations, a CRON scheduler, discussed further below, can be configured by enterprise server 104 to listen for time criteria including a time period of "1:00:00-3:30:00."

In some implementations, a user may select "Login" from event type list 308, which populates login list 316 and associated system event criteria 336. By way of example, a system administrator could select system event criteria 336 to remove permissions from users logging in from a "Dangerous Location." In some implementations, a list of dangerous locations could include network addresses, geolocations, global positioning system (GPS) coordinates, etc. In this example, enterprise server 104 can be configured to process login data from users and listen for login attempts from "Dangerous Locations."

In some other implementations, a user may select "Export" from event type list 308, which populates export list 320. By way of example, a system administrator could select system event criteria 340 to remove permissions from users attempting to export over "20" of the data object "Accounts." In some implementations, there may be subsets of system event criteria. For example, a system administrator could select system event criteria 340 to remove permissions from users attempting to export "20" "All Data Objects" with a further criterion of "10" "Contacts." As such, enterprise server 104 can be configured to listen for a type of system event that occurs when a user exports 20 data objects, some of which may be contacts, as well as, when a user exports 10 contacts.

In still other implementations, a user may select "Workflow Approval" from event type list 308. In some implementations, a selection from event type list 308 may generate an input field 324 configured to receive user input. An identification value corresponding to a "Workflow Id" may be inputted by a user into input field 324, which in some implementations, creates a system event for the workflow associated with the identification value. In some implementations, a workflow can be a data object rule that causes a workflow approval action to occur. For example, as new cases are assigned to a user, a corresponding task can be created. In this example, enterprise server 104 could be configured to listen for this workflow approval based upon the identification value corresponding to the workflow approval created.

In still other implementations, a user may select "Custom 1" from event type list 308, which populates custom list 328.

In some implementations, types of events may be customized to the needs of the organization using the enterprise system. By way of example, a system administrator for a pharmaceutical company could select system event criteria 344 to add permissions to users when a pharmaceutical application with the Food and Drug Administration receives "FDA Approval." In some implementations, a pharmaceutical application can be a custom data object. Moreover, enterprise server 104 can be configured to listen for updates and changes based on the application process at the Food and Drug Administration.

Figure 7:
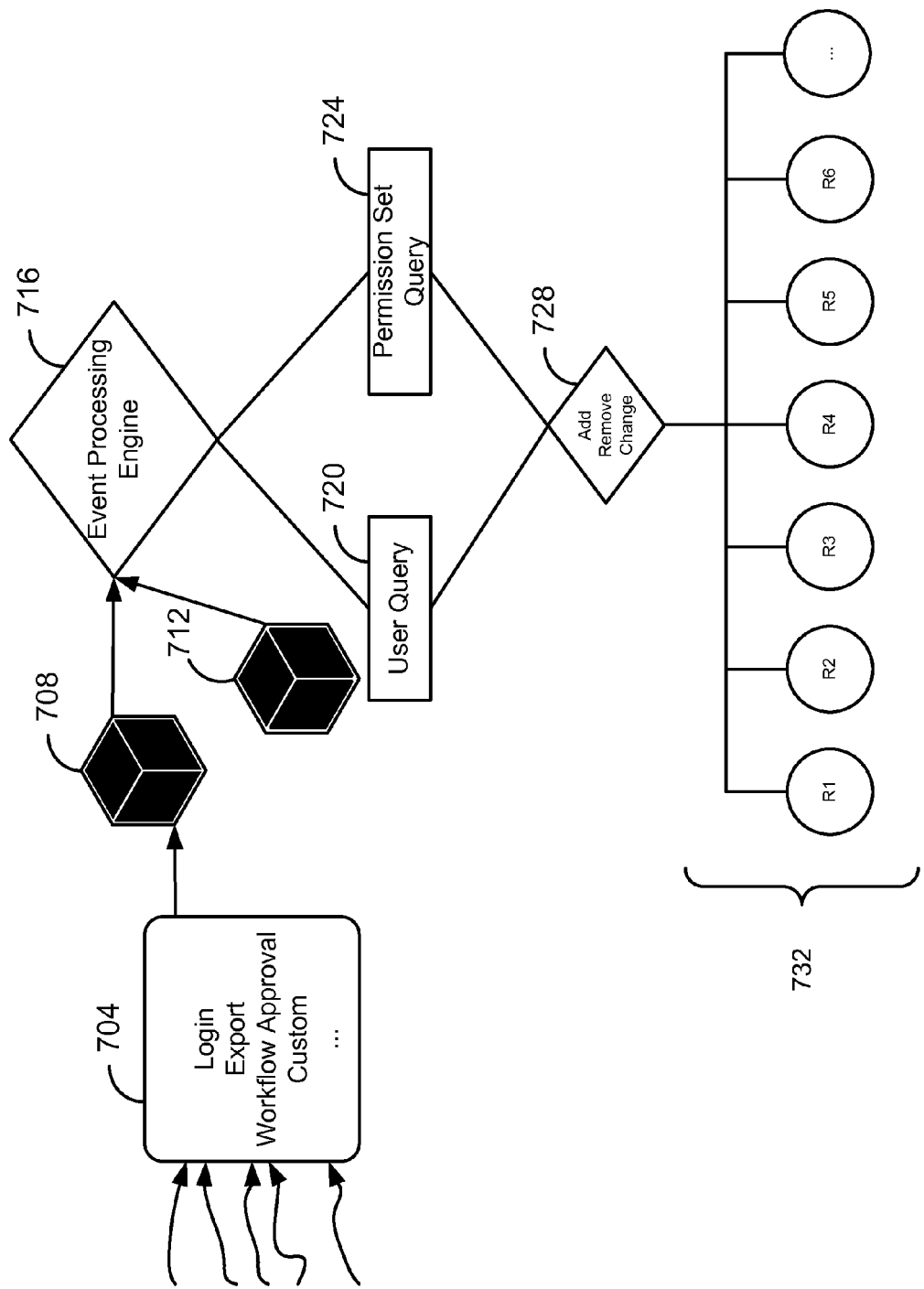
FIG. 7 shows an example of events being processed to manage permissions of users, in accordance with some implementations.

FIG. 7 shows an example of events being processed to manage permissions of users, in accordance with some implementations. As system events occur, the system events may be processed and screened by event listener 708. In some implementations, event listener 708 can be configured by enterprise server 104 with system event data stored in system event database 112. Event queue 704 may include designated types of system events, as well as, non-designated system events to be ignored and filtered out before being further processed by system event processing engine 716. In some implementations, event listener 708 may be configured to listen for a variety of different system events such as those examples discussed in detail above. In other implementations, event listener 708 may include additional event listeners, each of which may be configured to listen for one or many designated system events. For example, one event listener 708 may be configured to listen for a login system type while some other event listener 708 may be configured to listen for an export system event type and a custom system event type.

Returning to FIG. 2, in block 208, a designated type of system event is determined to occur. As a user interacts with data objects, some interactions may be interpreted as event criteria by enterprise server 104 of FIG. 1. Event listener 708 may evaluate system events, comparing the system event to designated types of system events stored in system event database 112. In some implementations, event listener 708 together with enterprise server 104 may process or "funnel" a system event to system event processing engine 716. For example, event listener 708 of FIG. 7 can be configured to listen for event criteria including a user attempting to export more than 20 data objects. As the user submits a request to export the 20$^{th}$ data object, a system event is determined to occur by event listener 708, causing enterprise server 104 of FIG. 1 to send determination data to system event processing engine 716. In other implementations, CRON scheduler 712 may process time criteria in the form of some measurable unit of time such as a specific time and/or date, a duration, or fixed interval, etc. For example, after a specified time threshold of 7 days, CRON scheduler 712 may determine that the 7 day time threshold was met, allowing system event processing engine 716 to process the system event. Also or alternatively, upon the determination in block 208, event processing engine 716 may further issue instructions to enterprise server 104 to carry out the steps in block 212 and 216 discussed further below.

Figure 4:
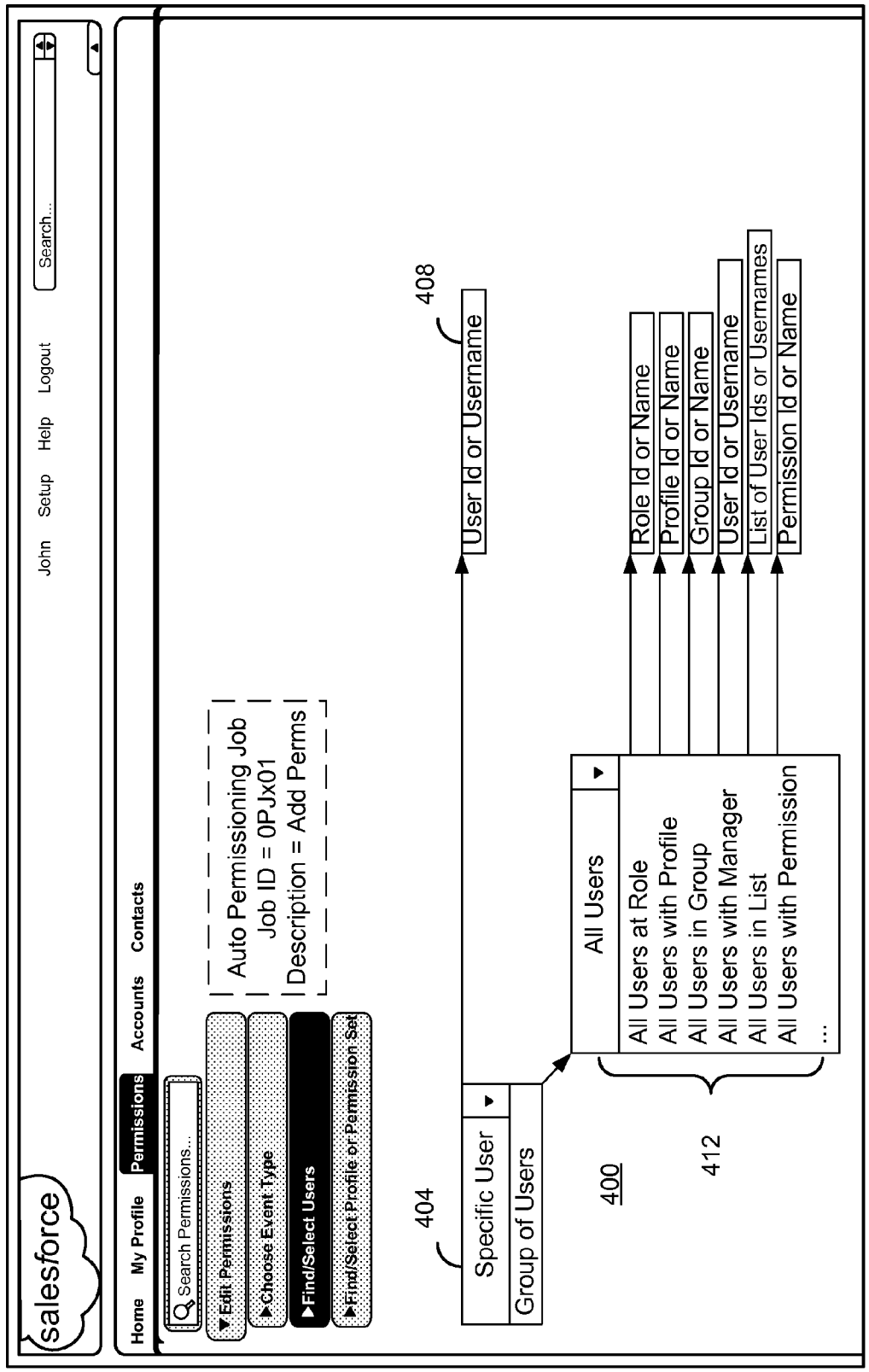
FIG. 4 shows an example of a user interface 400 in the form of a GUI as displayed on a computing device for selecting a user type, in accordance with some implementations.

Returning to FIG. 2, in block 212, designated users are identified. In some implementations, users may be identified with user criteria designated by enterprise server 104 of FIG. 1. In some implementations, user criteria can identify a specific user, while in other implementations user criteria can identify a group of users. For example, user criteria for a group of users can include user role, user profile, user group, user manager, user list, or custom user. In some implementations, criteria for group of users may be stored in user database 116 of FIG. 1. Also or alternatively, users may be identified by enterprise server 104 by performing one or more selection queries using a database programming language such as Salesforce Object Query Language (SOQL), Structured Query Language (SQL), etc. For example, FIG. 4 shows an example of a user interface 400 in the form of a GUI as displayed on a computing device for selecting a user type, in accordance with some implementations. In FIG. 4, a user may select "Specific User" or "Group of Users" as a type of user from user list 404. In one example, when a user selects "Specific User," user field 408 may be generated and displayed by enterprise server 104 of FIG. 1. In some implementations, a user may input a value corresponding to a "User ID," or "Username" to identify the user. For example, if a system administrator wanted permissions added to the user "Juan (username='juan@rainbowreaders.com, user id='z1x2')," the system administrator could type either "juan@rainbowreaders.com" or "z1x2" into user field 408.

In another example, a user selects "Group of Users" from user list 404. In some implementations, user criteria for groups can allow dynamic identification and/or selection of users. In other words, when a system event is processed by event processing engine 716 of FIG. 7 and user query 720 is executed, the pool of users from which users may be identified could change in the time between when the user criteria was created and when user query 720 was executed. For example, a system administrator selected "All Users" from user criteria list 412, but the associated system event may be triggered 6 months later. During the first month, 5 users would have been identified based on the "All Users" criteria. However, when the system event was triggered 6 months later, 10 new employees had joined the company. Thus, 15 users are identified. Also or alternatively, user criteria can include any other definable or identifiable criteria associated with a user. This can include all users according to their job role, for example, all users who are "Accountants." Another definable criterion includes all users according to their profile. For example, all users who have the "Guest" profile. Another definable criterion includes all users who are in a group. In some implementations, the group may be a public group. For example, all users who belong to the "Book Club" of an organization. Another definable criterion includes all users who have a manager. For example, all users managed by "Juan." In addition, another definable criterion includes all users in a list. For example, enterprise server 104 of FIG. 1 may process a list stored on one or may databases, where the list includes "Juan, Lola, and Frank." Also or alternatively, a user may be identified according to a permission that has been granted to him. For example, all users with a permission to "Edit Knowledge Articles."

Returning to FIG. 2, in block 216, permission sets are identified. In some implementations, permission sets may be identified by enterprise server 104 based on a permission set matching permission criteria. In some implementations, user criteria can identify permissions, while in other implementations permission criteria may identify one or more permission sets. Also or alternatively, permission sets may be identified by enterprise server 104 of FIG. 1 through SOQL, SQL, etc. queries.

Figure 5:
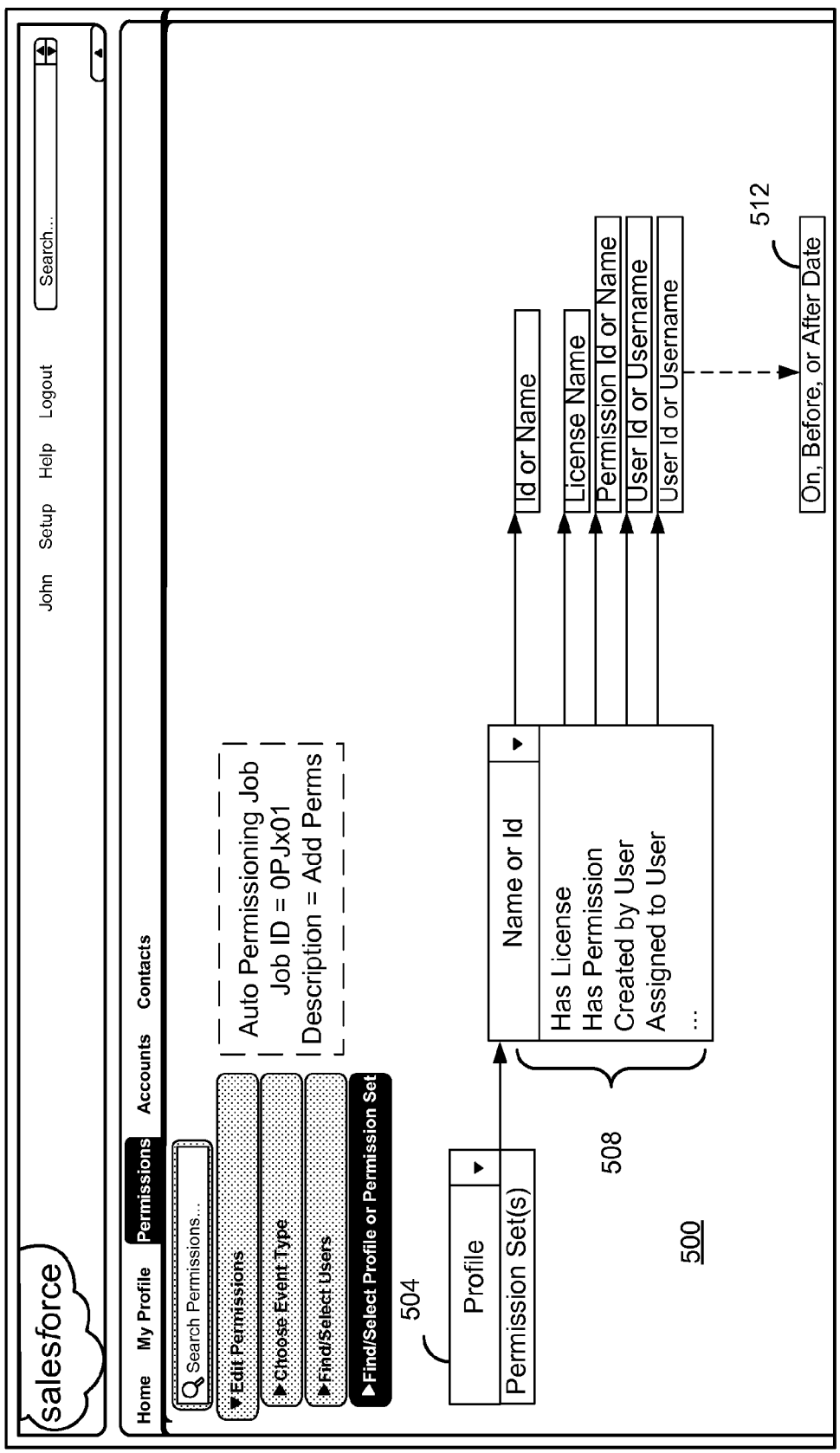
FIG. 5 shows an example of a user interface 500 in the form of a GUI as displayed on a computing device for selecting profiles or permission sets, in accordance with some implementations.

FIG. 5 shows an example of a user interface 500 in the form of a GUI as displayed on a computing device for selecting profiles or permission sets which relate to the permission(s) an administrator may grant or remove from a user, in accordance with some implementations. In FIG. 5, a user may select "Profile" or "Permission Sets" from permission list 504. In one example, a system administrator may select "Profile" from permission list 504, which can allow enterprise server 104 of FIG. 1 to identify profile permissions matching permission criteria such as a value for the "Profile." Expanding on the example above, a system administrator may schedule a change of Juan's profile and corresponding permissions on Jan. 2, 2016. As such, a system administrator may select "Change (Profile)" from action list 304 of FIG. 3 and input "1/2/2016" for system event criteria 332 of time list 312. Next, the system administrator types "Juan" into user field 408 of FIG. 4 and selects "Profile" from permission list 504. In some implementations, permission criteria may allow dynamic selection of permission sets. Returning to FIG. 7, similar to user query 720, permission set query 724 may dynamically identify and/or select permission sets according to permission criteria according to the context of when a system event is processed by event processing engine 716.

In another example, enterprise server 104 of FIG. 1 may identify permissions temporarily granted for specific purpose such as permissions granted automatically on Mar. 1, 2015 for tax season. In this example, a system administrator may select "Assigned to User" from permission set criteria list 508 of FIG. 5. The system administrator may enter a value, but also or alternatively, enterprise server 104 of FIG. 1 may designate a user after the system event is processed. In some implementations, permission criteria may include subsets of permission criteria. As such, a system administrator may enter a value for subset permission criteria 512 as "After Date—2/28/2015." In addition to permission set criteria discussed earlier, other non-limiting examples of permission criteria include: all permission sets having a name that starts with or ends with a predefined term; all permission sets that have a particular permission; all permission sets associated with a particular license or all permission sets without a license; all permission sets created by a specific user; all permission sets created on or after a particular date; all permission sets assigned to a group of users; permission sets based on when they were assigned to a specific user; etc.

Returning to FIG. 2, in block 220, permissions of users are added, removed, and/or updated. In some implementations, enterprise server 104 of FIG. 1 may automatically add or remove permissions from users. For example, in FIG. 7, after a system event is processed by event processing engine 716, user query 720 and permission set query 724 can cause permission of users to be added, updated, and/or removed according to their combination of processing instructions and action 728. In some implementations, action 728 is configured according to event processing engine 716 after receiving a system event. For example, a system event can include a selection from action list 304 of FIG. 3, which may correspond to action 728 of FIG. 7. In another example, on Apr. 15, 2015, a system event designated for that day may be processed. Enterprise server of FIG. 1 may execute SOQL commands to select users with the role "Accountant," select their permission sets assigned "After Date—2/28/2015," and remove permission sets from the users fitting the criteria.

Returning to FIG. 2, in block 224, in some but not all implementations, it is determined that permissions were successfully changed. In some implementations, the determination includes whether permissions were added, updated, and/or removed. Also or alternatively, the determination may return data to be processed by enterprise server 104 of FIG. 1 on details of a successful or unsuccessful change to permissions. In some implementations, whether permissions were modified successfully or unsuccessfully can be recorded in one or more log files. In other implementations, this determination may generate an additional system event to be processed by enterprise server 104 of FIG. 1.

Returning to FIG. 2, in block 228, in some but not all implementations, records are generated based on the determination in block 224. For example, records 732 of FIG. 7, which may contain some or all of the data reflected in log files, which can include details of the changes made to permissions of a user. Also or alternatively, existing records stored in automated permissioning job database 124 may be updated to reflect the determination in block 224.

In block 232, records generated in block 228 could be displayed in a user interface such as user interface 600 of FIG. 6. FIG. 6 shows a permission monitoring window 600 in the form of a GUI as displayed on a computing device for reviewing automated permissioning jobs, in accordance with some implementations. In FIG. 6, job records 604a, 604b, 604c, 604d, and 604e can be graphical representations of automated permissioning jobs that include some or all of the data necessary to implement some or all of blocks 204-220. Also or alternatively, records 732 of FIG. 7 may correspond to job records 604a, 604b, 604c, 604d, and 604e. A user may navigate to permission monitoring window 600 to view details of permissions to be added, removed, or updated. In addition, a user may navigate between pending tab 608, executed tab 612, and failed tab 616 to view the details generated in block 228. For example, a system administrator may navigate to monitoring window 600 to ascertain the status of current and past automated permission jobs.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 8A:
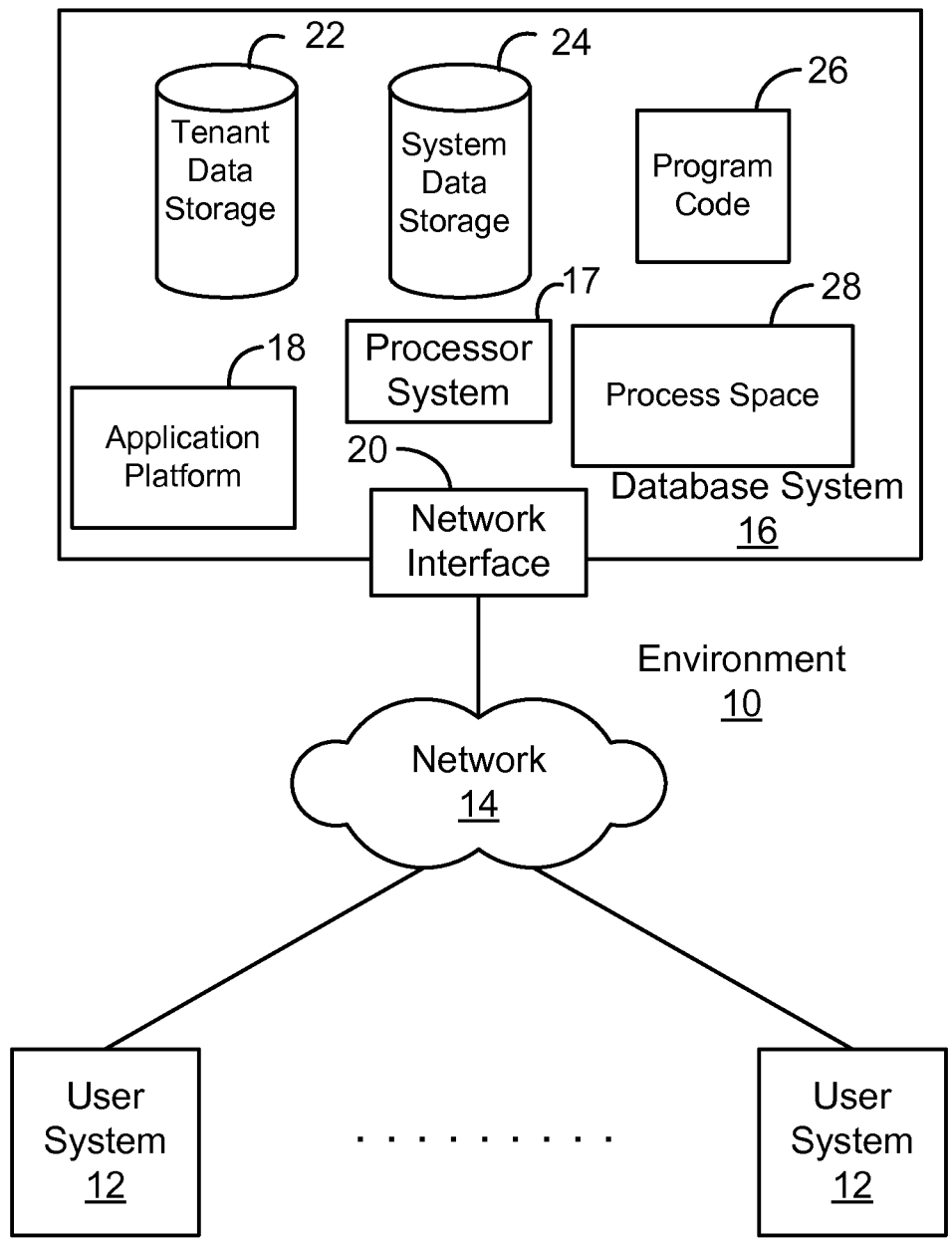
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
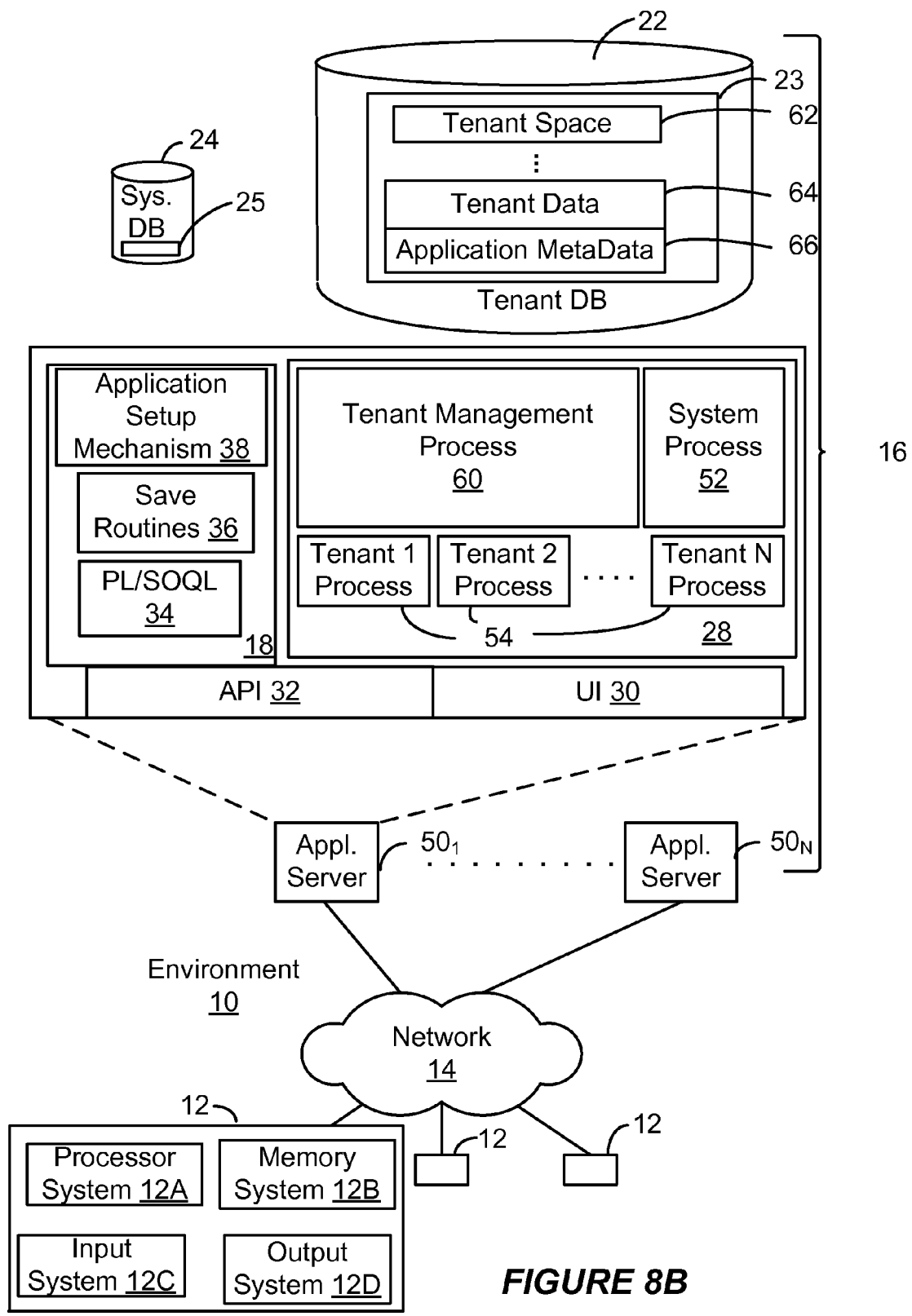
FIG. 8B shows a block diagram of an example of some implementations of elements of FIG. 8A and various possible interconnections between these elements.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
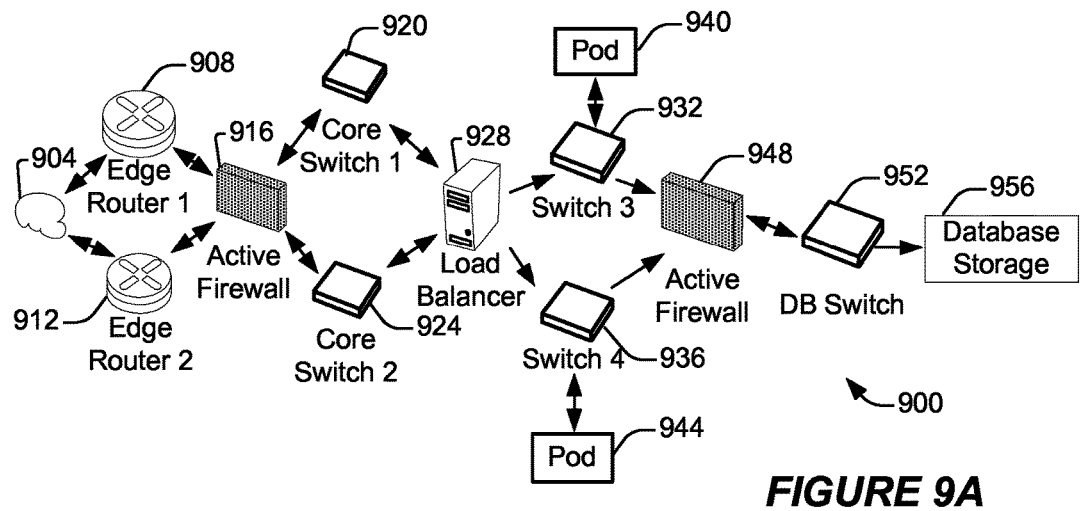
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
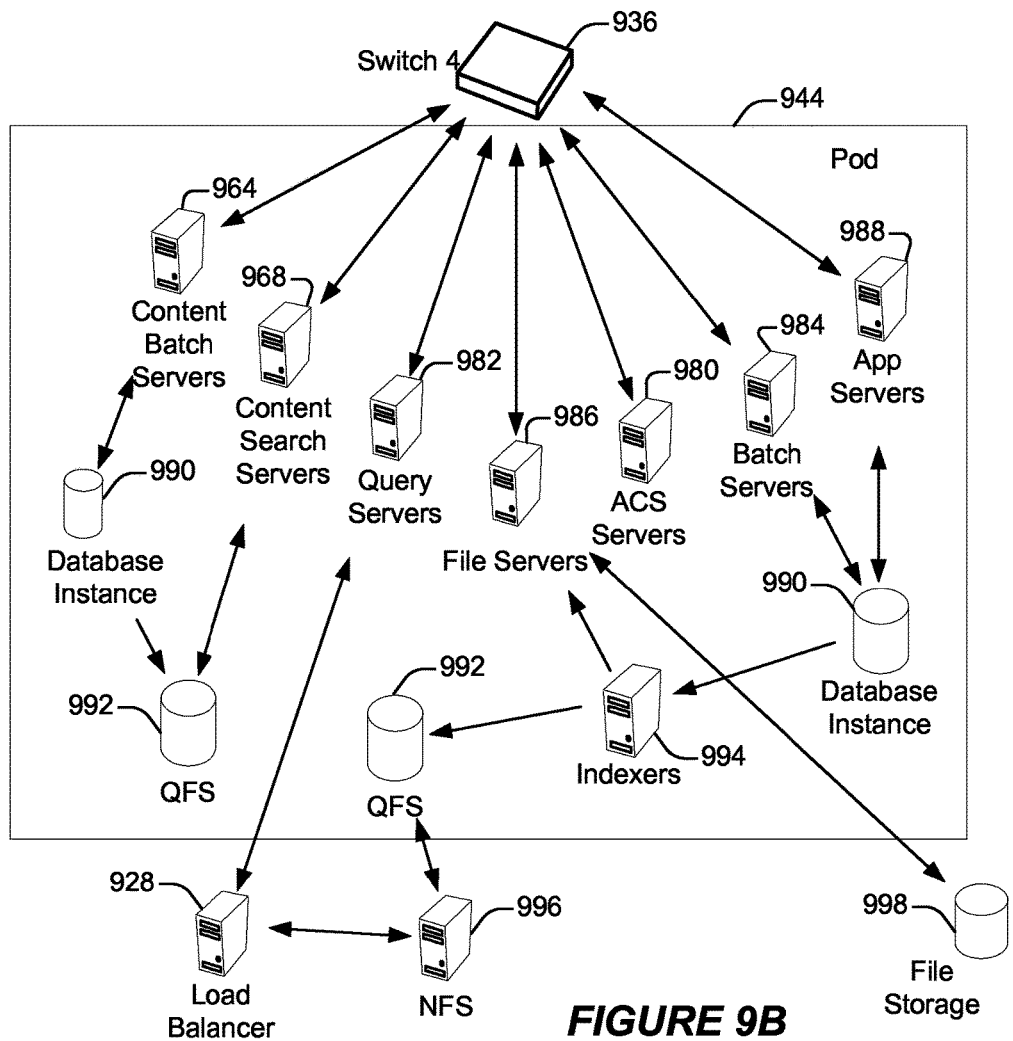
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
 a database system implemented using a server system comprising at least one hardware processor, the database system configurable to cause:
  maintaining at least one database storing data objects identifying a plurality of permission sets for a plurality of users;
  processing user input identifying a type of system event and identifying at least one user type;
  processing a plurality of system events using at least one event processing component, the processing comprising:
   identifying, using an event listener of the at least one event processing component, a subset of the system events as satisfying a first one of a plurality of system event criteria, the event listener configured to listen for system events according to the first system event criterion, the event listener having been generated based on the system event type, the at least one user type and a user-identified one of the permission sets, and
   identifying, using the event listener, a first system event of the subset of system events as satisfying a second one of the system event criteria, the event listener specifying the system event type as the second system event criterion;
  responsive to identifying the first system event:
   determining, using the database system, that a first one of the users matches at least one user criterion, and determining, using the database system, that at least one of the permission sets matches at least one permission criterion; and modifying at least one permission of the first user based on the at least one permission set.

2. The system of claim 1, the database system further configurable to cause:

determining that the at least one permission of the first user was successfully or unsuccessfully added, updated, or removed.

3. The system of claim 2, the database system further configurable to cause:

generating a record based on the determined successfully or unsuccessfully added, updated, or removed at least one permission of the first user, the record having data corresponding to changes made to permissions of users; and displaying, in a user interface on a display of a user device, the record data.

4. The system of claim 1, the database system further configurable to cause:

determining, using a scheduler, that a system event of the system event type has occurred based on at least one time criterion.

5. The system of claim 1, wherein the event listener has an event listener ID.

6. The system of claim 1, the database system further configurable to cause:

initiating performance of the event listener.

7. The system of claim 1, wherein the specified system event type is one of a plurality of system event types comprising at least one of: a login system event, an export system event, a workflow approval system event, or a custom system event.

8. The system of claim 1, wherein the user-identified user type is one of a plurality of user types comprising at least one of: a user role, a user profile, a user group, a user manager, a user list, or a custom user.

9. A method comprising:

maintaining at least one database storing data objects identifying a plurality of permission sets for a plurality of users;

processing user input identifying a type of system event and identifying at least one user type;

processing a plurality of system events using at least one event processing component, the processing comprising:

identifying, using an event listener of the at least one event processing component, a subset of the system events as satisfying a first one of a plurality of system event criteria, the event listener configured to listen for system events according to the first system event criterion, the event listener having been generated based on the system event type, the at least one user type and a user-identified one of the permission sets, and identifying, using the event listener, a first system event of the subset of system events as satisfying a second one of the system event criteria, the event listener specifying the system event type as the second system event criterion;

responsive to identifying the first system event:

determining, using a database system implemented using a server system comprising at least one hardware processor, that a first one of the users matches at least one user criterion, and determining, using the database system, that at least one of the permission sets matches at least one permission criterion; and modifying at least one permission of the first user based on the at least one permission set.

10. The method of claim 9, further comprising:

determining that the at least one permission of the first user was successfully or unsuccessfully added, updated, or removed.

11. The method of claim 10, further comprising:

generating a record based on the determined successfully or unsuccessfully added, updated, or removed at least one permission of the first user, the record having data corresponding to changes made to permissions of users; and causing display, in a user interface on a display of a user device, of the record data.

12. The method of claim 9, further comprising:

determining, using a scheduler, that a system event of the system event type has occurred based on at least one time criterion.

13. The method of claim 9, wherein the event listener has an event listener ID.

14. The method of claim 9, further comprising:

initiating performance of the event listener.

15. The method of claim 9, wherein the specified system event type is one of a plurality of system event types comprising at least one of: a login system event, an export system event, a workflow approval system event, or a custom system event.

16. A computer program product comprising computer-readable program code to be executed by at least one processor when retrieved from a non-transitory computer-readable medium, the program code comprising instructions configured to cause:

maintaining at least one database storing data objects identifying a plurality of permission sets for a plurality of users;

processing user input identifying a type of system event and identifying at least one user type;

processing a plurality of system events using at least one event processing component, the processing comprising:

identifying, using an event listener of the at least one event processing component, a subset of the system events as satisfying a first one of a plurality of system event criteria, the event listener configured to listen for system events according to the first system event criterion, the event listener having been generated based on the system event type, the at least one user type and a user-identified one of the permission sets, and identifying, using the event listener, a first system event of the subset of system events as satisfying a second one of the system event criteria, the event listener specifying the system event type as the second system event criterion;

responsive to identifying the first system event:

determining, using a database system implemented using a server system comprising at least one hardware processor, that a first one of the users matches at least one user criterion, and determining, using the database system, that at least one of the permission sets matches at least one permission criterion; and modifying at least one permission of the first user based on the at least one permission set.

17. The computer program product of claim 16, the instructions further configured to cause:
   determining that the at least one permission of the first user was successfully or unsuccessfully added, updated, or removed.

18. The computer program product of claim 17, the instructions further configured to cause:
   generating a record based on the determined successfully or unsuccessfully added, updated, or removed at least one permission of the first user, the record having data corresponding to changes made to permissions of users; and
   displaying, in a user interface on a display of a user device, of the record data.

19. The computer program product of claim 16, the instructions further configured to cause:
   determining using a scheduler, that a system event of the system event type has occurred based on at least one time criterion.

20. The computer program product of claim 16, the instructions further configured to cause:
   initiating performance of the event listener.

\* \* \* \* \*